United States Patent

Paul

[15] 3,661,015
[45] May 9, 1972

[54] DENSIMETER FOR PIPELINE-TRANSPORTED LIQUIDS

[72] Inventor: Guy Paul, Saint-Maur, Val de Marne, France

[73] Assignee: Societe des Transports Petroliers par Pipe-Line (Societe Anonyme), Paris, France

[22] Filed: Dec. 9, 1969

[21] Appl. No.: 883,459

[30] Foreign Application Priority Data

Dec. 11, 1968 France..................................177619

[52] U.S. Cl................................................73/437, 73/445
[51] Int. Cl. ........................................................G01n 9/10
[58] Field of Search....................73/437, 434, 435, 445, 444, 73/433, 451, 452, 453, 441, 32

[56] References Cited

UNITED STATES PATENTS

| | | | |
|---|---|---|---|
| 1,188,527 | 6/1916 | Young | 73/437 |
| 2,923,158 | 2/1960 | Reynold | 73/437 |
| 1,177,128 | 3/1916 | Moeller | 73/441 |
| 1,257,662 | 2/1918 | Young | 73/447 |
| 1,272,605 | 7/1918 | Becker | 73/437 |
| 2,348,733 | 5/1944 | Fischer | 73/32 |
| 2,460,503 | 2/1949 | Howe | 73/453 |

FOREIGN PATENTS OR APPLICATIONS 725,856 1932 France....................................73/451

OTHER PUBLICATIONS

Considene " Process Instruments and Controls Handbook" 1958 page 7/56
Jones " Instrument Technology" 1957 pages 32, 33

*Primary Examiner*—Richard C. Queisser
*Assistant Examiner*—Ellis J. Koch
*Attorney*—Karl F. Ross

[57] ABSTRACT

A densimeter for evaluating the specific gravity or mass-volume relationships of a pipeline-distributed liquid, e.g. a petroleum product transmitted from a source to a distribution center, in which a periodically opened valve feeds the liquid into a densimeter cell having a downwardly converging bottom and a cup-shaped upper part in which a plunger with a tapered bottom is received. The liquid is fed to the measuring cell from below and overflow at the top thereof, while the plunger has a density which is heavier than that of the liquid and thus is buoyed upwardly in accordance with the relative specific gravity of the liquid. The plunger is connected to a sensitive balance contained within a thermostatically controlled and mechanically insulated housing to produce an output representing the specific gravity of the liquid and to transmit this output to a digital readout indicating the specific gravity of the liquid and triggering automatic or manual response to facilitate distribution of the particular petroleum product traversing the pipeline.

8 Claims, 5 Drawing Figures

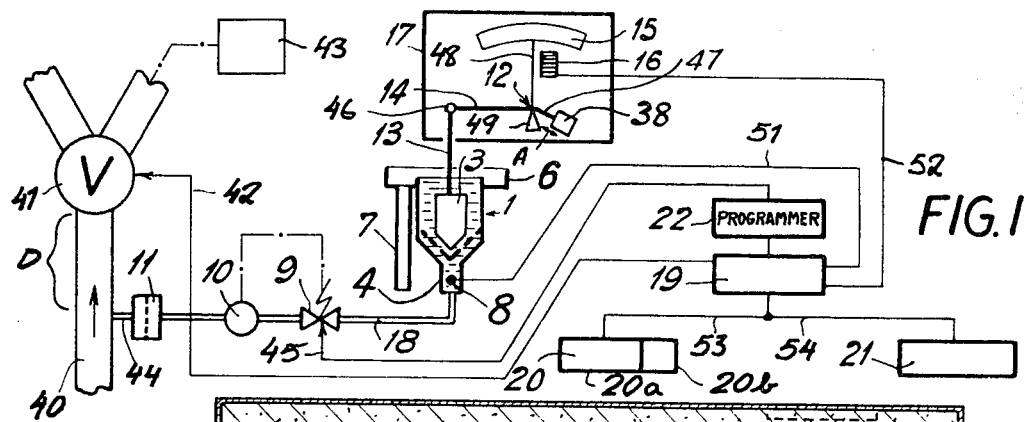
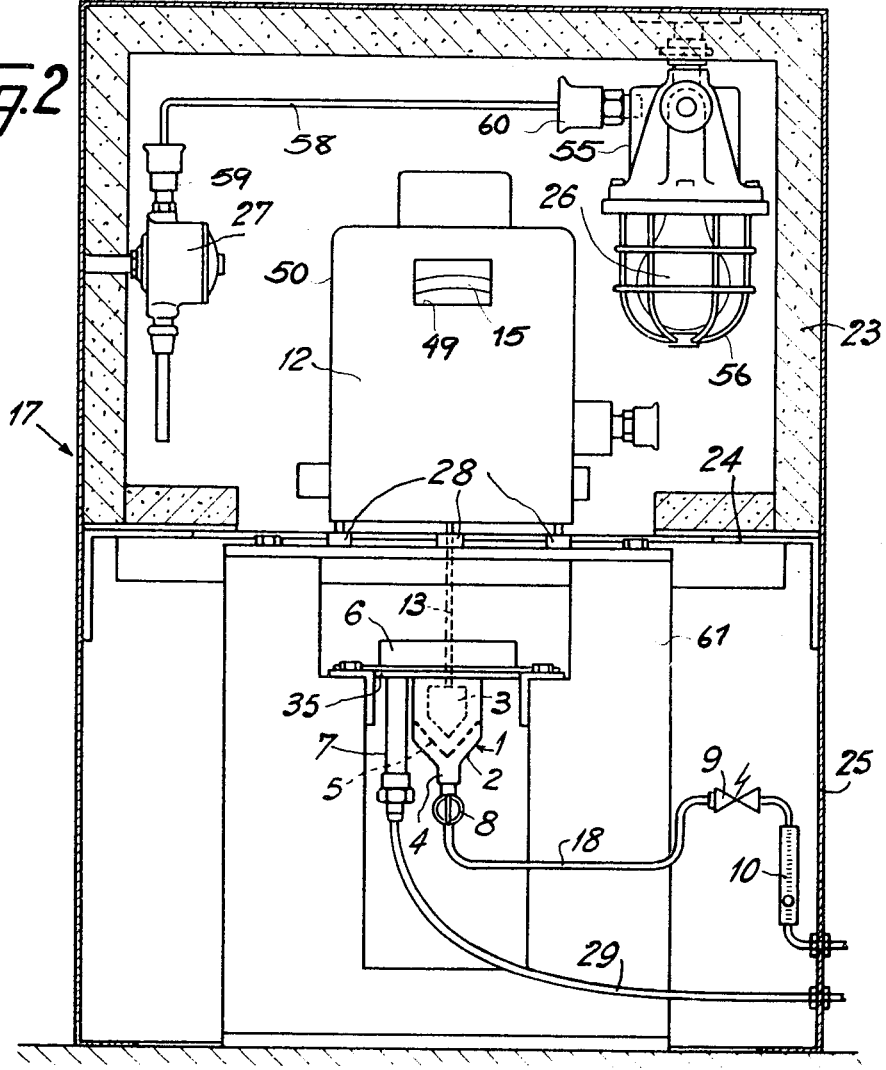

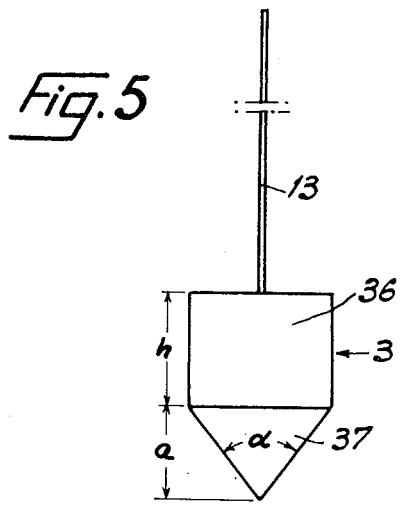
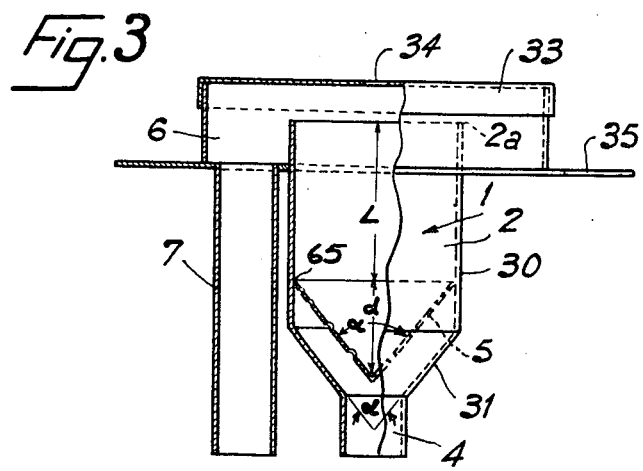
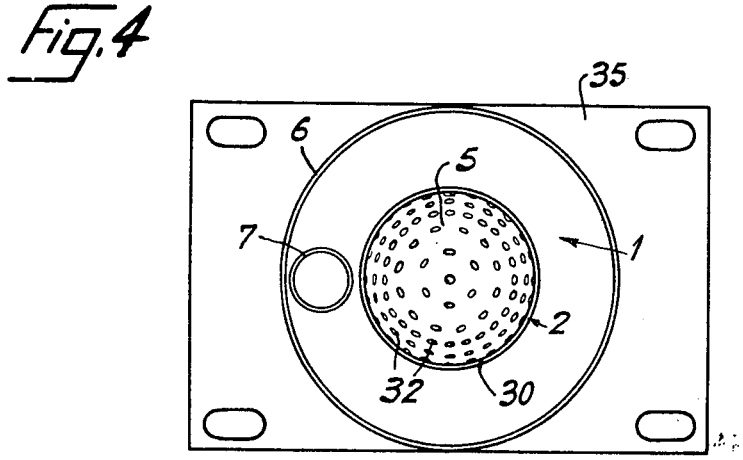

DENSIMETER FOR PIPELINE-TRANSPORTED LIQUIDS

My present invention relates to a densimeter for the detection of various pipeline-transported liquids and, more particularly, to a densimeter for the high rate and iterative measurement of the specific gravity or density of petroleum samples removed from a pipeline.

It has become a common practice in the petroleum industry and especially in the segments of this industry relating to the distribution of petroleum products, generally after refining, to transmit the various petroleum products to the distribution center or from the distribution center by pipeline. It is equally common to use a single pipeline for a number of different petroleum products which are distinguishable by their specific gravities, specific mass, specific volume or mass-volume relationship. In fact, one of the significant pieces of information with respect to any liquid in the chemical and allied industries and in the food industry is the density, specific gravity or mass-volume relationship of the liquid. These characteristics have been found to be most useful in the petroleum industry, for example, to switch a particular body of liquid transmitted along a pipeline ahead of a body of another liquid and behind still another body of liquid, to a particular locale for further processing, distribution or use. Primarily, this type of transmission is employed between a refinery and the centers of distribution. Upon their arrival at the distribution centers, the several bodies of liquid are directed along different channels toward, for example, tanks or reservoirs associated with the particular substance involved. Numerous methods have been proposed for detecting the arrival of a particular body of liquid in a pipeline and for directing it along the proper path from the trunk pipe. For the most part, these techniques make use of some basic characteristics of the liquid and generally a pronounced physical property thereof which is more or less readily ascertainable. Specific gravity is one such property.

However, considerable difficulty has been encountered heretofore in determining the specific gravity of pipeline-transported liquids. Firstly, the operation must be carried out upon a liquid under pressure and in a state of movement, whereas most specific-gravity measuring systems are designed exclusively for ambient pressure and static states. Secondly, the quantity of liquid which is available for sampling or may be withdrawn from the larger body of liquid in the pipeline should be relatively small so as to prevent lag in the determination of specific gravity and preclude delays in the handling of large-size samples. Thirdly, it is desirable to carry out the measurement at ambient pressure but conventional devices are incapable of measurement under these conditions when the sample is derived under pressure. Fourthly, the measurement frequency must be relatively large and conventional specific gravity meters are incapable of the rapid change of the sample and the high-speed response necessary for frequent readouts. Finally, it is essential that the measurement be made in as short a time as possible to eliminate the danger of the change in the sample during the period of measurement. Under all circumstances, it is desirable further that the apparatus be capable of measuring specific gravity within a wide range of densities, e.g. about 0.5 to 1, such ranges being beyond the capacity of most prior-art densimeters.

It is, therefore, the principal object of the present invention to provide an improved system for the measurement and indication of the density or specific gravity of a liquid.

Another object of my invention is to provide an apparatus for the measurement of the specific gravity or mass-volume relations of a petroleum product transmitted through a pipeline so as to enable diversion of the various products traversing the pipeline.

Another object of the invention is to provide a system enabling the high rate sampling and specific-gravity measurement of petroleum products in a flowing and pressurized state, which is accurate and insensitive to changes in ambient conditions, provides highly reproducible results of considerable precision, requires small liquid samples, permits rapid interchange or replacement of the liquid samples, and is relatively inexpensive and simple to maintain.

Still another object of the invention is to provide an automatic densimeter of great precision and reliability, capable of periodic operation at short intervals for the measurement of the mass-volume relations of samples abstracted from a liquid traversing a pipe or duct.

Still further, it is an object of this invention to provide an improved system for distributing petroleum products traversing a trunk pipeline, in succession, to respective reservoirs in accordance with the specific gravity of the liquids.

These objects and others which will become apparent hereinafter are attained, in accordance with the present invention, in a device for the measurement of the mass-volume relationships of a liquid sample abstracted from a pipeline traversed by the liquid. The device comprises, in a housing as will be described hereinafter, a sampling cell of generally upright cup-shaped cylindrical configuration, formed with a downwardly converging (conical) base, at the center of which is provided an inlet for the upwardly flowing liquid sample. At the upper end of this cell, I provide an annular overflow or trough along the periphery of the cylindrical wall of the cell to collect the sample and return it to the pipeline. Within the cell there is suspended a plunger or immersion body having a geometrical configuration generally similar to that of the interior of the seal and, consequently, with a conical bottom portion and a cylindrical upper portion, this plunger having a specific gravity greater than the specific gravity of the most dense liquid to be sampled. This plunger forms part of an automatic-weighing device capable of remote indication of the position of the plunger which is buoyed to a greater or lesser extent by the liquid within the cell in accordance with the specific gravity of the latter.

According to a specific feature of this invention, the automatic-weighing device is of the balance type in which a balance arm is swingable about a low-friction (knife-edge) fulcrum and is affixed by a rod to a plunger at an articulation between this rod and the balance arm. The other arm of the balance may be provided with a counterweight and the arm is further provided with a sector which swings relatively to a sensor or detector of the transducer type, capable of providing an electrical output indicating the extent of swing of this sector. This construction provides a relatively large output displacement for relatively small variations in the depth of immersion of the plunger in the sample liquid within the cell and thereby affords high accuracy of the readout.

The readout system may, consequently, include a photoelectric transducer responsive to a change in the light characteristics as a result of displacement of the sector, an electromechanical transducer responsive to variations in displacement as detected by a magnetic pickup, e.g. of the meter type, or any other transducer capable of translating the displacement of the sector into an electrical output processable by analogue or digital output means. Preferably, however, a digital output is desired as will be apparent hereinafter.

The cooperation of an upwardly open upright cell and a coaxial immersion body receivable therein from above, has been found to permit the use of a cylindrical receptacle or cup whose height is slightly greater than that of the immersion body and thus of a capacity only slightly greater than the volume of the body which is to be immersed. In this manner, the quantity of liquid which must be drawn as a sample to measure the density at each cycle is minimized and the speed of replacement of a previous sample by a successive sample is maximized.

It may be pointed out at this juncture that earlier density-measuring systems have, for the most part, been non-linear and thus incapable of translation without compensatory devices into a direct readout of the specific gravity. By contrast, the system of the present invention, as described above, is based upon the Archimedean law of immersed bodies, whereby the balance here measures the apparent weight of the plunger and consequently provides a linear or substantially linear output, the apparent weight being a linear function of the mass-volume relationship of the liquid. Preferably the sampling cell or cup has a circular cross-section (in the horizontal plane) and is fed centrally at the bottom of the upwardly diverging and downwardly converging conical base so that the liquid flows upwardly and outwardly.

The immersion body or plunger has a complementarily tapering conical tip or bottom of similar conicity to minimize turbulence and measurement perturbations arising from the flow of liquid past the plunger and, vice versa, movement of the plunger through the liquid. To further reduce such perturbations, it has been found to be advantageous to provide between the plunger and the inlet a deflecting means for preferentially urging the liquid toward the periphery of the cell. It has been found that a most effective deflecting means for this purpose can include a false bottom between the plunger and the base of the cell at which the inlet opens centrally. This false bottom, which constitutes of the cell a double-bottom receptacle, is upwardly divergent and downwardly convergent with a conicity equal to that of the true bottom and the plunger, and is perforated with a hole density increasing outwardly from the axis of the cell. When reference is made here to the "hole density," it is intended to describe a system in which the amount of open space proportional to the total area of the surface increases radially outwardly from the center of the perforated bottom, by virtue of an increase in the number of apertures or changes in the cross-sectional areas of the apertures. It may be noted that total suppression of movement of the plunger and the balance by the rising liquid in the cell is not desirable since the balance should attain a position of equilibrium for each measurement and, indeed, static friction alone may prevent accurate readings when successive samples are measured with slight variations in the specific gravity. The displacement of the plunger and the beam will not, however, markedly increase the time required for measurement since the liquid provides adequate damping of any oscillation that might develop.

The automatic balance of the present invention provides an electrical signal which, preferably, operates a digital readout providing a visible indication of the specific gravity of the sample liquid. A computer stage may be provided to compare this measurement with stored information indicating the distribution of the particular liquid which may then automatically be diverted to an appropriate storage facility. Alternatively, an operator may review the readings of the indicator and manually switch the petroleum product to the appropriate reservoir. In any case, I prefer to provide a printer or other permanent-record device which will register the values of the specific gravity as a function of time. The apparatus also comprises a program for cyclically sampling the liquid traversing the pipeline, e.g. in the form of a timer which periodically opens a valve communicating with the inlet to the cell. In addition to this valve, there may be provided a flowmeter adapted to close the valve once an appropriate quantity of liquid has been delivered to the cell.

The above and other objects, features and advantages of the present invention will become more readily apparent from the following description, reference being made to the accompanying drawing in which:

FIG. 1 is a schematic diagram of the complete apparatus in accordance with the present invention;

FIG. 2 is a vertical section showing the sampling device;

FIG. 3 is an elevational view, partly in section, of the sampling cell;

FIG. 4 is a plan view of the cell with its cover removed; and

FIG. 5 is an elevational view of the plunger, cooperating with the cell of FIG. 3.

In FIG. 1, I show the measurement cell or receptacle 1 which is illustrated in greater detail in FIGS. 2 and 3, but which is fed centrally and from below, via a line 18, with petroleum products sampled from a pipeline 40. The pipeline 40 is provided with a distributing valve 41 triggered by an electrical input represented at 42 to deliver the particular product to the reservoir 43 or from other distribution. The velocity of the liquid traversing the pipeline 40 should be such, with respect to the distance D between the sampling point 44 and the valve 41, that the determination of the specific gravity is made and the signal for controlling the valve 41 applied as the liquid reaches this valve.

The duct 18 is supplied through an electrically operated valve 9, controlled by an input represented at 45 from a programmer or timer 22, the function of which will become apparent hereinafter. Upstream of the valve 9, there is provided along line 18 a flowmeter 10 and a filter 11. The cell 1 has a downwardly convergent conical double bottom terminating in a cylindrical stem 4 through which the liquid is supplied to the cell. Furthermore, an overflow trough or catch basin 6 is provided at the upper end of the cell to carry off displaced prior liquid samples and excess liquid via line 7.

The immersion body or plunger 3 is rigid with a rod 13 articulated at 46 to the beam 14 constituting one arm of an automatic balance represented diagrammatically at 12. The balance is illustrated schematically in FIG. 1 and comprises a counterweight arm 47 upon which the counterweight 38 is shiftable in the direction of arrow A. To adjust the counterweight, the latter may be internally threaded and screwed onto the externally threaded arm 47 of the balance. A sector 15 is affixed to the balance beam 14, 47 by a rod 48 so as to swing about the fulcrum 49 with this beam. The sector 15 may constitute a scale co-operating with a pointer and visible through a window 49 of a housing 50 for the balance as shown in FIG. 2. In addition, the scale 15 co-operates with a sensor or detector 16 constituting a transducer adapted to produce an electric output proportional to the apparent weight of the plunger 3. In the embodiment illustrated, the detector 16 may be a magnetic pickup coil co-operating with a magnetically permeable sector 15, or an optical pickup co-operating with indicia upon this sector, e.g. a variable-optical density pattern.

The balance 12 is also contained within an enclosure represented at 17 and serving as a thermally insulating device so that the specific gravity measurements are made under essentially isothermal conditions. In addition, the housing 17 prevents damage by fire to the system and may be an explosion-proof enclosure. As also is apparent from FIG. 1, the base of the sampling cell 1 is provided with a temperature sensor 8 whose electrical output is applied at 51 to a memory-bank computer 19 together with the input 52 from the detector 16. The computer 16 has an output 53 to trigger the digital indicator 20 which at 20a displays numerically the specific gravity of the liquid and that 20b displays numerically the temperature of the sample. A second output 54 operates a printing recorder 21 at which the temperature and specific gravity are displayed at increments of time determined by the programmer 22. A direct output from computer 19 may control the valve 41 as shown at line 42 or an operator viewing the digital readout 20 may manually control this valve 41. When a reading is complete, the memory-bank system 19 co-operates with the programmer 22, the latter determining the sampling time and interval.

The thermally and fire-resistant housing 17 is mounted upon a support 24 and is enclosed in a metal shell 25, the balance chamber of which is provided with a thermally insulating layer 23. The upper chamber is maintained at a constant temperature slightly above the ambient exterior maximum by a heater 26 in the form of an incandescent lamp whose base is threaded into a socket 55 and shielded by a wire cage 56. The socket 55 is of the explosion-proof type. Control of the heater is effected by a thermostat 27 mounted upon the chamber wall and likewise of the explosion-proof type. The connection of the conductor 58 between the thermostat 27 and the socket 55 is made via explosion-proof fittings 59 and 60. The balance and the measuring cell are fixed upon the support 61 by elastic shock-absorbing feet 28 which prevent transmission of vibration to the measuring system. From FIG. 2 it can also be seen that the discharge tube 7 is connected to an outlet pipe 29 within the housing and that the valve 9 and the flowmeter 10 are located within the housing as well.

The measuring cell is shown in somewhat greater detail in FIG. 3. From this FIGURE it will be apparent that the measuring cell is mounted upon a horizontal support plate 35 and comprises a cylindrical upper portion 30 and a frustoconical base 31 whose apex angle is represented at α. A cylindrical stem 4, co-axial with the frustoconical portion 31 opens into the latter centrally and is connected with the line 18 via the temperature-measuring transmitter 8. Above the base 31 there is provided a false bottom 5 constituting a deflector which preferentially spreads the incoming liquid outwardly between the plunger and the cylindrical wall of the upper portion 30. The deflector 5 is perforated and provided with apertures 32 increasing in hole density outwardly of the center of this deflector, and is of conical configuration with the apex angle α. At the base of the cone, it is secured at 65 to the inner wall of the cylindrical portion 30 at a location above the junction of the cylindrical portion with the frustoconical portion 31. The upper horizontal edge 2a of the cell 1 lights above the plate 35 and within an annular trough 6 whose cover 33 is formed with a hole 34 to clear the rod 13 of the plunger 3. The outlet 7 extends downwardly parallel to and alongside the cup portion 2 of the measuring cell.

The plunger 3 has the configuration of a cylinder 36 at its upper part and terminates at its lower end 37 in a cone with the apex angle α. Furthermore the altitude $a$ of the conical portion 37 of the plunger is equal substantially to the depth $d$ of the conical deflector 5 while the altitude $h$ of the cylindrical portion 36 of the plunger is slightly less than the height L of the cylindrical portion 30 of the cup above the location 65. To eliminate the possibility of corrosion, the plunger 3 is composed of a metal with a highly polished surface and low corrosivity, e.g. a stainless-steel or a chromium-plated metal. Moreover, the plunger may be hollow and filled with an appropriate weighting mass to impart a weight thereto which is greater than the mass of a portion of the most dense liquid to be sampled for a corresponding volume.

The densimeter described above is adapted to be used for measuring the mass-volume characteristics of petroleum products with specific gravities ranging between light gasoline and fuel oil which may be considered lightly viscous, i.e. products with viscosities between 0.5 and 100 centistokes.

The programmer at 22 transmits at regular intervals, every 15 seconds, a signal to open the electromagnetic valve 9. A portion of the liquid traversing the pipeline 40 then passes through duct 18 and flows upwardly through the central inlet of the cell 1. Under the pressure prevalent in the pipeline, the petroleum product is forced through the deflector 5 and fills the cell while displacing the liquid previously contained therein from a prior measurement. As the liquid rises to the top of the cell, the flowmeter 10 closes the valve 9 and thereby ensures filling of the cell regardless of the viscosity of the liquid. However, the duration for which the valve 9 remains open depends on the viscosity of the liquid and the valve remains open as long as the cell requires filling.

The central introduction of the liquid at the base of the measuring cell, together with the outward deflection of the liquid by the cone 5 and the conical configuration of the walls 5 and 31, ensures that the principal flow of the liquid takes place toward the periphery of the cone and guarantees a substantially uniform liquid upwardly into the measuring cell in all vertical and radial planes of the latter. The preferential distribution towards the walls of the cell also guarantees that excessive dynamic displacement of the flow plunger. As soon as the flow stops any oscillation of the plunger is damped by viscous drag of the liquid and a signal is immediately transmitted to the memory bank 19. Instructions previously recorded in the latter are then compared with the results of the specific gravity measurement, and the valve 41 operated to transmit the particular body of liquid to the appropriate reservoir 43.

It is thus possible to carry out a large number of measurements with relatively short intervals between them without unduly increasing the size of the beam because the amplitude of displacement of the latter is relatively small.

A slight displacement of the immersion body 3 by the dynamic action of the liquid is not, however, disadvantageous inasmuch as it ensures movement of the plunger into an equilibrium position for each measurement, as is important, especially when successive measurements are carried out with liquids whose density differ little from one another. A temperature compensation of the results is provided by the memory bank and it may be recalled that, depending upon the season of the year and other factors, the liquid traversing the pipe line may have temperatures varying within a wide range. Density and specific gravity are, of course, functions of temperature, and in the absence of such temperature compensation, the results obtained by the automatic balance may prove meaningless. In practice, an automatic balance using optical detection was capable of measuring an apparent weight of 500 grams with a precision of 0.02 grams. When the sensitivity of the device was increased by using an extension plate on the sector coded with a gray wedge using optical detection yielded a precision of $\pm 0.0005$.

The invention described above is amenable to modification and variation by those skilled in the art, and all such modifications are intended to be included within the spirit and scope of the appended claims.

I claim:

1. A densimeter for measuring the specific gravity of a liquid comprising an upright measuring cell open at its top; means for feeding a liquid into said cell at the bottom thereof and for removing liquid overflowing from the top of said cell; an immersion body with a density greater than that of said liquid received in said cell and suspended in the liquid therein, the interior of said cell and the exterior of said body having geometrically similar downwardly converging and pointed configurations, said cell closely surrounding said body in an immersed condition thereof; automatic weighing means connected to said body and responsive to the apparent weight thereof; and deflector means of similar geometric configuration as said immersion body in said cell above the bottom thereof for spreading incoming liquid outwardly toward the walls of said cell.

2. The densimeter defined in claim 1 wherein said automatic weighing means includes a pivotal sector angularly displaceable in accordance with the apparent weight of said body and detector means cooperating with said sector for producing an electrical signal representative of said apparent weight.

3. The densimeter defined in claim 1 wherein the means for feeding said liquid to said cell includes flowmeter means adapted to measure the quantity of liquid entering said cell for thereafter determining the influx of liquid to said cell.

4. A densimeter for measuring the specific gravity of a liquid comprising:
an upright measuring cell open at its top;
means for feeding a liquid into said cell at the bottom thereof and for removing liquid overflowing from the top of said cell;
an immersion body received in said cell and buoyed by liquid therein;
automatic weighing means connected to said body and responsive to the apparent weight thereof;
a thermally insulated housing enclosing said automatic-weighing means and forming an explosion-proof enclosure therefor;
heater means in said enclosure for maintaining the interior thereof at a temperature slightly above the maximum temperature of the ambient exterior, said cell having a cylindrical upper portion and a frustoconical lower portion coaxial with one another, said frustoconical lower portion defining a central inlet for said liquid along the axis of said cell, said plunger having a cylindrical upper portion and a conical power portion with an apex angle corresponding to that of said frustoconical lower portion of said cell.

5. The densimeter defined in claim 4 wherein said liquid is abstracted from a pipeline for petroleum products, said densimeter further comprising electrically operated valve means between said pipeline and said inlet and energizable to admit liquid from said pipeline into said cell; flowmeter means between said pipeline and said inlet and traversed by the liquid entering said cell for metering the quantity thereof for closing said valve upon filling of said cell; an annular collecting trough surrounding the top of the cylindrical portion of said cell for collecting liquid displaced therefrom and draining the displaced liquid from said enclosure; resilient mounting means for elastically supporting said weighing means and said cell against vibration in said enclosure; programming means connected with said valve for periodically opening same; temperature-sensing means along the path of the liquid supplied to said cell for indicating the temperature of the liquid entering the cell; and digital readout means connected to said automatic-weighing means and to said temperature-sensing means for indicating the temperature of the liquid entering said cell and a measure of the density thereof.

6. The densimeter defined in claim 5 wherein said cell is provided, spaced above its bottom, with a conical deflector having the same conicity as said lower portion of said plunger and said frustoconical portion of said cell and converging in the same direction thereof, said deflector being formed with openings of a greater density outwardly from the axis of said cell.

7. The densimeter defined in claim 6 wherein said deflector is provided with a multiplicity of apertures increasing in number outwardly from said axis.

8. The densimeter defined in claim 7 wherein said automatic-weighing means includes a balance beam, a rod articulated to said beam and rigidly connected with said body, an adjustable counterweight on said beam, a sector connected with said beam and swingable about the fulcrum thereof, and transducer means cooperating with said sector for providing an electrical output representing the density of the liquid in said cell.

* * * * *